May 16, 1961  G. MONNET ET AL  2,984,051
APPARATUS FOR SURFACING GLASS
Filed April 1, 1958  5 Sheets-Sheet 2
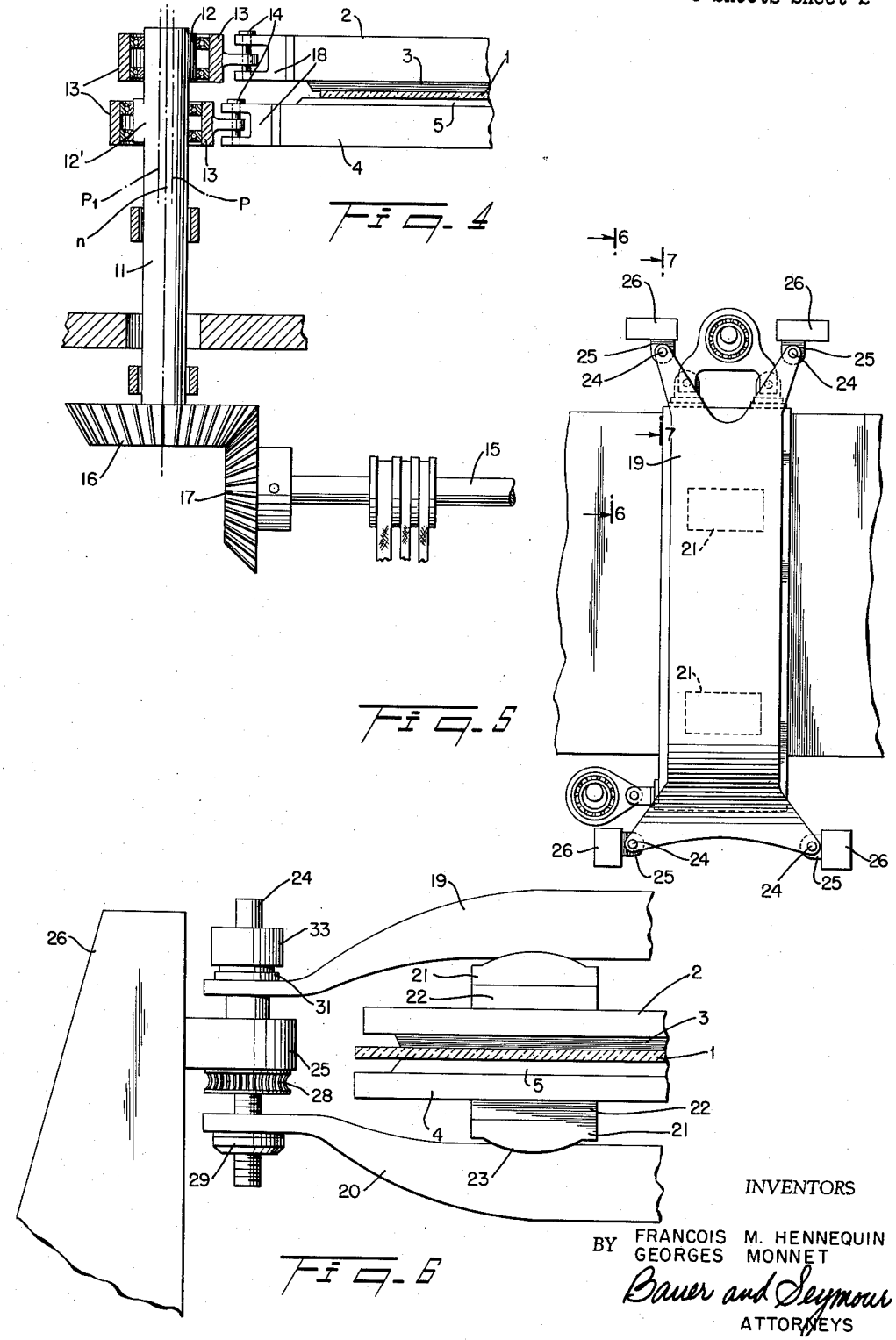
INVENTORS
FRANCOIS M. HENNEQUIN
GEORGES MONNET
BY
Bauer and Seymour
ATTORNEYS

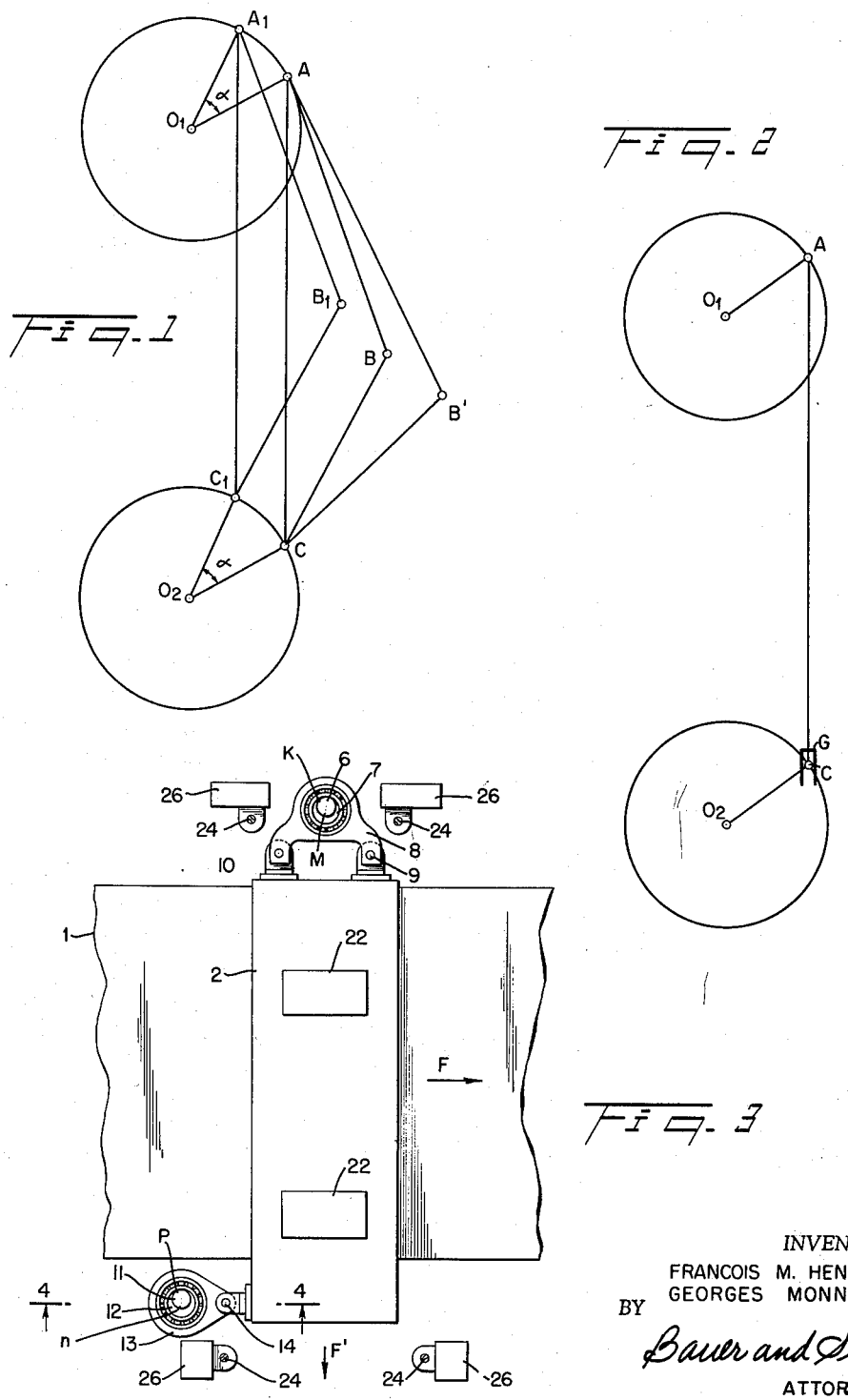

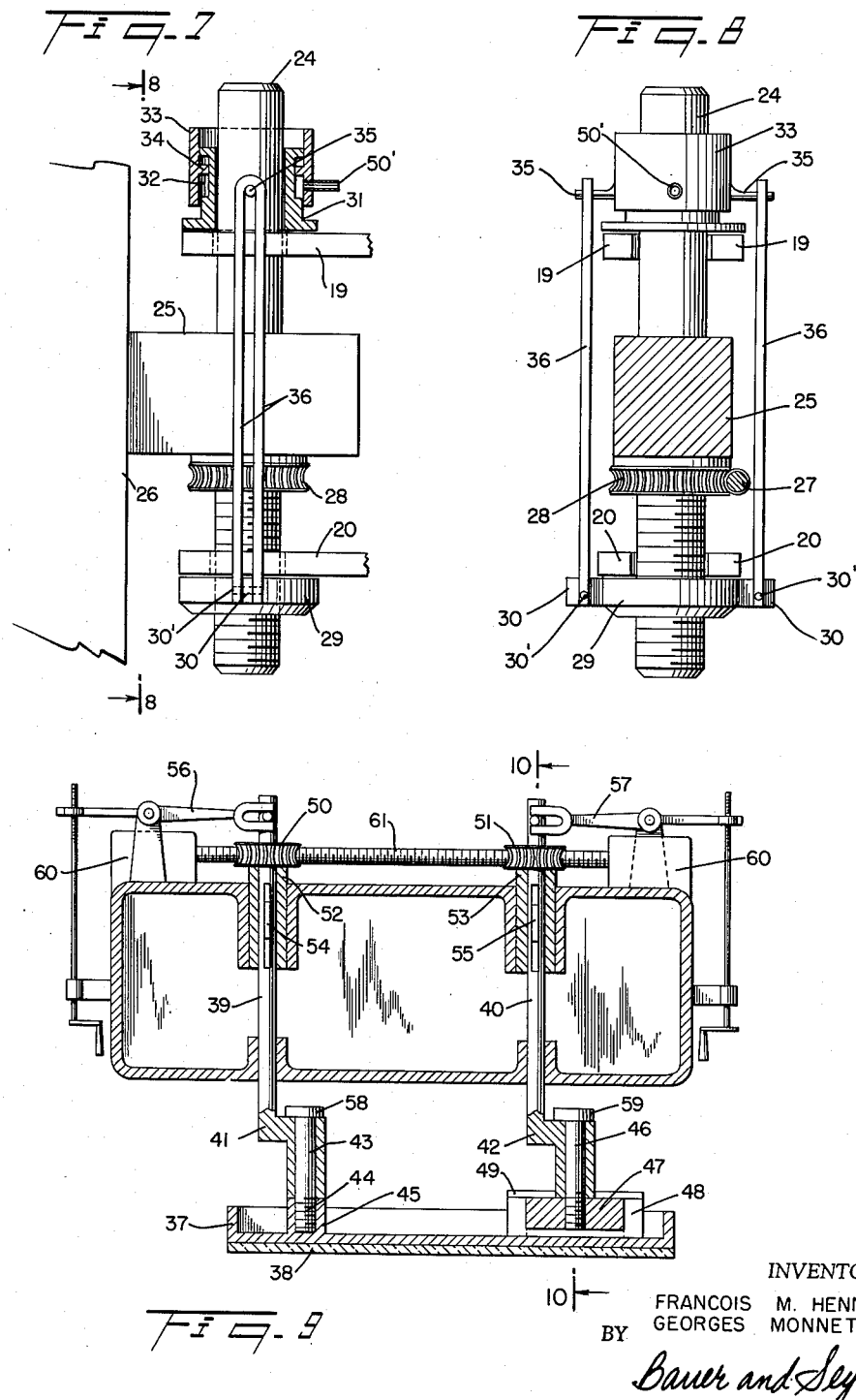

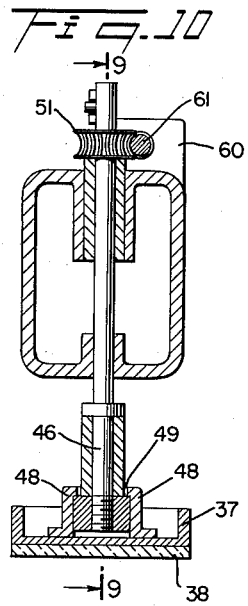
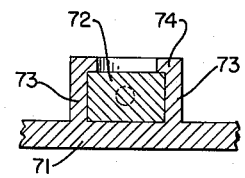
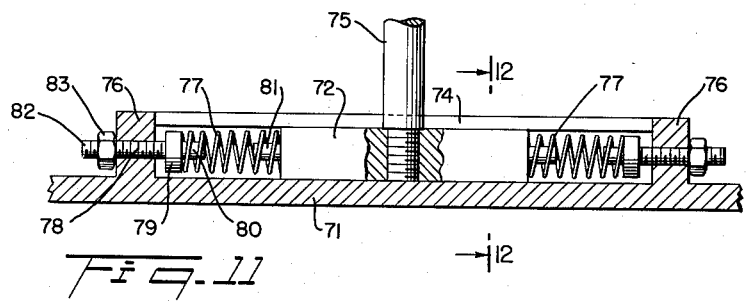
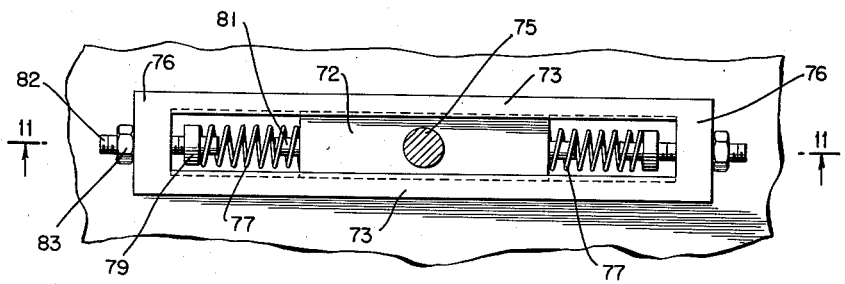

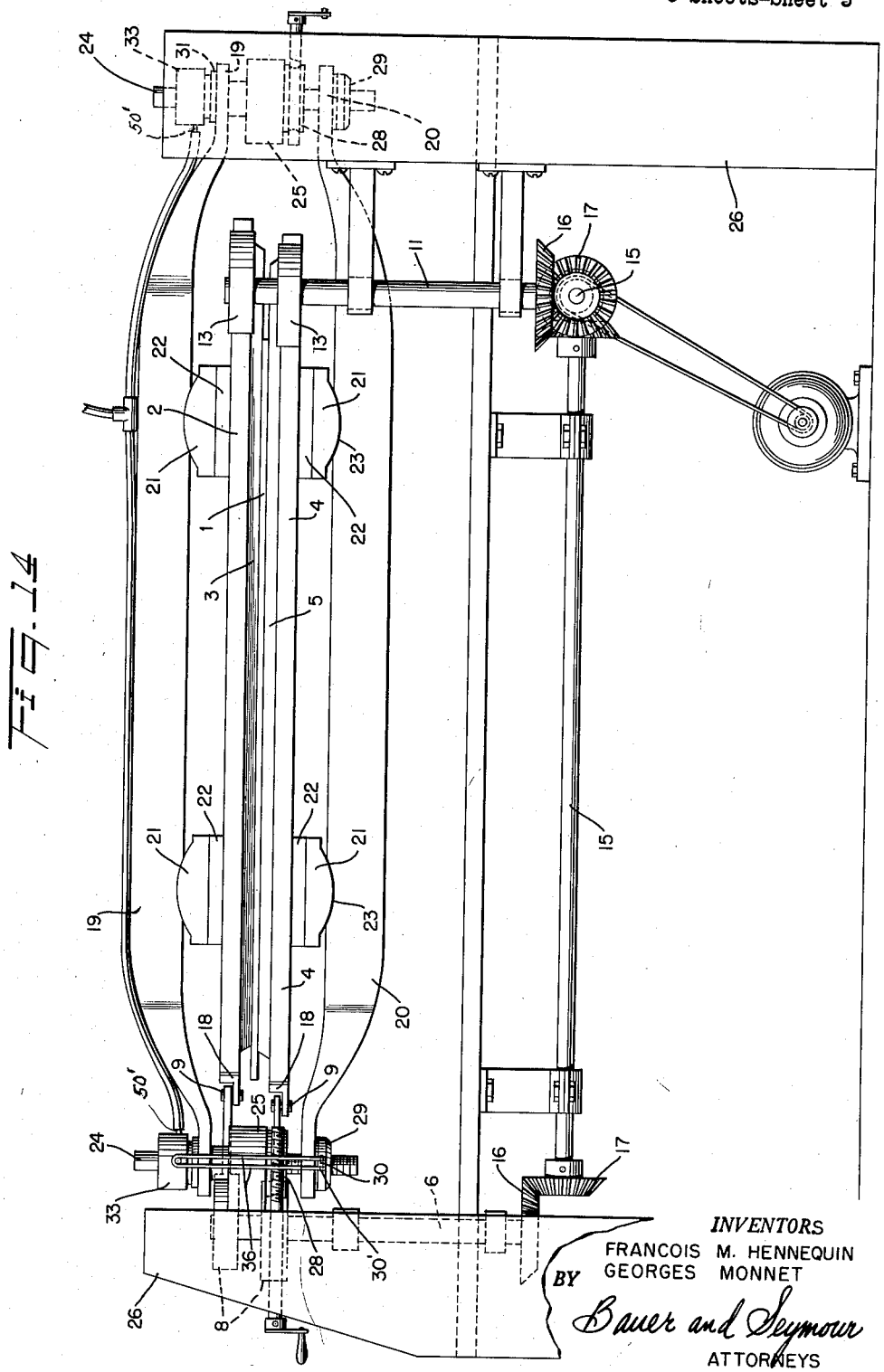

United States Patent Office 2,984,051
Patented May 16, 1961

2,984,051
APPARATUS FOR SURFACING GLASS
Georges Monnet, Moirans, France, and François Maurice Hennequin, Milan, Italy, assignors to Compagnie de Saint-Gobain, Paris, France
Filed Apr. 1, 1958, Ser. No. 725,581
Claims priority, application France Apr. 11, 1957
40 Claims. (Cl. 51—119)

This invention relates to apparatus for surfacing glass, and more particularly to apparatus for surfacing glass sheets or plates by one or more surfacing tools driven with a translatory motion along closed directing curves.

The invention has among its objects the provision of novel glass surfacing apparatus.

A further object of the invention lies in the provision of novel glass surfacing apparatus incorporating one or more surfacing tools driven with a translatory motion along closed directing curves.

A further object of the invention lies in the provision of an improved glass surfacing apparatus of the type above indicated, such apparatus incorporating a novel improved driving mechanism for the tool which eliminates the imposition upon the tool and the driving means therefor of any strains caused by changes of dimension of the parts, as by thermal expansion or contraction.

Still another object of the invention lies in the provision of an improved glass surfacing apparatus which is simple, rugged, and easily operated, adjusted, and maintained.

Yet another object of the invention lies in the provision, in glass surfacing apparatus employing one or more surfacing tools driven with a translatory motion along closed directing curves, of novel mechanism for exerting glass-surfacing pressure upon the tool or tools.

Still a further object of the invention resides in the provision of a novel apparatus for simultaneously surfacing glass sheets or plates on both sides thereof.

Another object is the provision of an improved method of surfacing glass sheets and plates.

A still further object of the invention lies in the provision, in apparatus of the type indicated in the preceding paragraph, of novel improved mechanism for exerting glass-surfacing pressure on tools operating on opposite sides of the glass sheets or plates, and for adjusting the surfacing pressures on the tools.

The above and further objects and novel features of the invention will more fully appear from the following description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views—

Figure 1 is a diagram illustrating the principle of operation of apparatus made in accordance with a first illustrative embodiment of the invention (Figures 3 to 8, inclusive);

Figure 2 is a diagram illustrating the manner of operation of a second illustrative embodiment of the apparatus (Figures 9 to 13, inclusive);

Figure 3 is a fragmentary view in plan of the first illustrative embodiment of the apparatus of the invention, the upper transverse bar which thrusts the surfacing tool against the glass being removed;

Figure 4 is a fragmentary view in vertical axial section through the driven shaft of one of the driving means for the tool, the section being taken generally along line 4—4 of Figure 3, certain of the parts being shown in elevation;

Figure 5 is a view in plan of the portion of the apparatus shown in Figure 3, the transverse bar thrusting the upper surfacing tool against the glass being shown in place;

Figure 6 is a fragmentary view partially in side elevation and partially in vertical section through the apparatus of Figure 5, the section being taken generally along the line 6—6 of Figure 5;

Figure 7 is an enlarged view partially in end elevation and partially in vertical axial section through a portion of the apparatus shown in Figures 5 and 6, the section being taken generally along the line 7—7 of Figure 5;

Figure 8 is a view partially in end elevation and partially in vertical section through the portion of the apparatus shown in Figure 7, the section being taken generally along line 8—8 of Figure 7;

Figure 9 is a view in longitudinal vertical section through a second illustrative embodiment of the apparatus made in accordance with the invention, the section being taken generally along line 9—9 of Figure 10, certain of the parts being shown in elevation;

Figure 10 is a view in vertical transverse section through the apparatus of Figure 9, the section being taken generally along line 10—10 of Figure 9;

Figure 11 is a fragmentary view in longitudinal vertical section through a portion of an apparatus similar to that shown in Figures 9 and 10 but having a modified connection between the surfacing tool and one of the driving means therefor;

Figure 12 is a view in vertical transverse section through the apparatus of Figure 11, the section being taken generally along line 12—12 of Figure 11;

Figure 13 is a view in plan of the apparatus shown in Figure 11; and

Fig. 14 is a view in end elevation of the apparatus at one glass surfacing station, such apparatus incorporating the elements of the apparatus shown in Figs. 3–8, inclusive.

As above indicated, the invention is particularly concerned with apparatus for surfacing glass sheets or plates, such apparatus including one or more surfacing tools driven with a translatory motion along closed directing curves. Although the invention is not restricted thereto, the tool or tools are conveniently driven by means of two cranks having the same radius, such cranks being mounted to rotate on parallel axes, being connected to spaced points on the surfacing tool, and being driven in synchronism and in phase. All the points on the surfacing tool, which is thus driven, rotate in synchronism about circles having radii of the same length.

It is always difficult to maintain such type of surfacing apparatus in its correct operating condition. Under the influence of heat generated by the surfacing operation the surfacing tool expands more or less, so that the distance between the points of attachment of the respective cranks to the tool does not remain constant. Additionally, the parallelism of the cranks may be disturbed by wearing of the parts and by elastic distortion of the various parts of the whole assembly, for example, when the surfacing tool encounters a resistance to its movement which is greater at one end of the tool than at the other. For these reasons, high stresses may be imposed upon the surfacing tool and on the driving means therefor, such as the driving shafts, cranks, etc. Such stresses may become dangerously high, particularly when the surfacing tool is driven at high speed.

The apparatus of the invention overcomes the above outlined difficulties in glass surfacing apparatus of the type described, which employs one or more surfacing tools which are driven with a translatory motion along closed directing paths by causing two points of the surfacing tool to move in synchronism in curves parallel to the directrix. One of the principal features of the invention consists in driving the surfacing tool by two driving means connected thereto at spaced points, one of said driving means being rigidly attached to the surfacing tool at one point so as to cause the tool to describe a directing curve at such point. The other driving means, synchronized with the first driving means, is attached to the surfacing tool by a mechanical connection permitting a freedom of movement between such second driving means and the surfacing tool.

The invention will be best understood by consideration of the diagrams of Figures 1 and 2, which illustrate generally two manners in which the invention may be carried out. Figure 1 shows diagrammatically the manner of operation of the apparatus shown in Figures 3 to 8, inclusive; Figure 2 shows diagrammatically the manner of operation of the apparatus shown in Figures 9 to 13, inclusive.

In Figure 1 there is shown a crank $O_1A$ rotating around point $O_1$, the crank being attached to a surfacing tool (not shown) at a point A. A second crank $O_2C$ having the same radius as the first crank, and rotating in the same direction and in synchronism and in phase with the first crank, is attached to the surfacing tool at a second point B. Instead of being directly and rigidly attached to the surfacing tool, however, as is the first crank, the second crank is attached to the tool through the medium of a rod or link BC. The line AC by definition describes a circular translatory movement having a radius $O_1A = O_2C$, and always moves parallel to itself. When the triangle ABC remains undeformed, the line AB also describes a circular translatory movement and moves parallel to itself. If, however, for example, as the result of a rise in temperature, the line AB of the surfacing tool increases in length so that it now occupies the position AB', the freedom of movement permitted by link BC permits the point B to assume the position B'. Point B' is at the intersection of two circular arcs having radii AB' and CB, the latter of which remains constant in spite of variations in the length of the surfacing tool. Thus in spite of variations of the length of the tool, the tool continues to travel with a circular translatory movement. Neither the tool nor its driving means is subjected to any additional forces as a result of changes in the dimensions of the parts.

In the apparatus shown schematically in Figure 2, the second driving means for the tool, instead of being directly attached to the tool as is the first driving means at point A, is attached thereto by means of a guideway and slide arrangement, either the guideway or the slide being attached to the second driving means and the other of the parts being attached to the tool. Specifically, the guideway G is attached to the surfacing tool (not shown) so as to extend longitudinally thereof, the second driving means being connected to the slide C in such guideway. The manner of driving the surfacing tool illustrated in Figure 2 also permits the surfacing tool to expand and contract freely without imposing any deleterious stresses on either the surfacing tool or the driving means therefor.

Turning now to the first of the illustrative embodiments of the apparatus shown, the cranks $O_1A$ and $O_2C$ of Figure 1 are replaced, in Figures 3 to 8, inclusive, by eccentrics 7 and 13, respectively, producing the same effect. A sheet of glass 1 is shown travelling in the direction F between an upper surfacing tool 2 and a lower surfacing tool 4. Tool 2 has an upper plate member provided with a lower surfacing structure 3. The lower surfacing tool 4 has a lower plate provided with an upper surfacing structure 5 thereon. The surfacing tools are of substantially the same rectangular shape, are disposed perpendicularly to the direction of movement of the sheet of glass, and extend completely across the width of such sheet of glass. It will be understood that surfacing structures 3 and 5 may be in the form of layers of felt, and that a polishing medium such as a suspension of a fine abrasive in water is fed by conventional means between the structures 3 and 5 and the upper and lower surfaces of the glass sheet.

At one of its ends the upper surfacing tool 2 is driven by a vertical shaft 6 which is disposed laterally centrally of the tool and beyond the end thereof. Shaft 6, which has a geometrical axis $k$, has fixed thereto an eccentric 7 having a geometrical axis $m$. The axis $m$, in rotating about axis $k$, communicates its movement to the confronting end of the surfacing tool through the medium of an eccentric follower 8 which embraces the eccentric and is fixedly connected to such end of the surfacing tool. Eccentric follower 8 has two symmetrically disposed laterally spaced legs which are removably connected to the end of the tool by means of removable pins 9 and 10 extending through the ends of the legs and through the ears of brackets affixed to the tool. The lower surfacing tool 4, is similarly drivingly connected to shaft 6 shown at the top in Figure 3. An eccentric identical with eccentric 7 is mounted on shaft 6 therebelow, but its geometrical axis is displaced 180° around the axis $m$. An eccentric follower cooperating with such latter eccentric is connected to the confronting end of the lower surfacing tool 4. The relationship between the above two described eccentrics is similar to that between eccentrics 12 and 12', which are now to be described in connection with the second driving means for the two surfacing tools, shown at the lower lefthand corner of Figure 3.

At the other extremity of the surfacing tools but at one side thereof each surfacing tool is driven by a vertical shaft 11 which has a geometrical axis $n$. At the upper end of shaft 11 there is fixedly connected thereto an eccentric 12 having a geometrical axis $p$. An upper eccentric follower 13 embraces eccentric 12. The portion of eccentric follower 13 confronting the side of surfacing tool 2 is in the form of a link 13' which is pivotally connected to tool 2 by a single removable pin 14 which extends through ears on a bracket 18 affixed to the side of the tool and through the end of link 13' interposed between such ears. In order to allow movement of tool 2 toward and away from the glass as the surfacing structure 3 wears down, the vertical space between the ears of bracket 18 markedly exceeds the vertical thickness of the end of the link 13' between the ears. A similar relationship exists between the corresponding link 13' for driving the lower surfacing tool 4 and the bracket 18 therefor. The above described connections between the eccentric followers such as that shown at 8 and the end of each of the tools shown at the upper portion of Figure 3 also provided for a similar limited range of vertical movement between the surfacing tools and their driving means at such ends of the tools.

Fixedly positioned on shaft 11 below eccentric 12 is a second identical eccentric 12', the geometrical axis $p'$ of which is displaced 180° around axis $n$ of shaft 11 with respect to the geometrical axis $p$ of eccentric 12. Eccentric 12' is provided with an eccentric follower 13 which embraces the eccentric, the end of the link-forming body of the eccentric follower being pivotally connected to surfacing tool 4 by means of a removable pin 14 extending through the ears of bracket 18 attached to tool 4 and the end of the link disposed between such ears.

Shafts 6 and 11 common to upper and lower tools are driven in synchronism and in phase as by means of synchronous motors or by geared connections (not shown) connecting such shafts to a single prime mover. The portion of the driving apparatus for shaft 11 shown in Figure 4 consists of bevelled gears 16 and 17 and a drive shaft 15 connected, as explained, either to its own synchronous motor or to a source of power common to it and shaft 6.

It will be seen, by comparing Figures 1 and 3, that the apparatus of Figures 3 to 8, inclusive, functions in the same manner as that of the diagram of Figure 1, and prevents the imposition of any substantial additional force upon the mechanism when parts thereof such as the surfacing tools change in length as by being heated. Under such condition the distance between axes $m$ and 14 will increase. Because of the pivotal attachment of cam followers 13 to the sides of their respective surfacing tools, however, this produces only a slight angular tipping of the surfacing tools relative to their initial position when they were unexpanded, and does not impose any destructive force upon them or their driving mechanism.

The described manner of driving of the surfacing tools 2 and 4 allows their ready removal and replacement as, for example, when the surfacing structures 3 and 5 have become worn out. Thus it is then necessary only to remove pins 9, 10, and 14 from the tools and to remove the tools laterally in the direction F' indicated in Figure 3. The massive abutment members 26 disposed at each end of the tools and constituting a part of the mechanism by which the tools are pressed against the glass, are sufficiently spaced longitudinally of direction of travel of the glass to permit the tools to be withdrawn in such direction.

The mechanism whereby pressure is imposed upon the surfacing tools to thrust them against the glass is particularly shown in Figures 5 to 8, inclusive. An upper transverse pressure bar 19 and a lower transverse pressure bar 20 extend between pairs of abutment members 26 disposed on opposite sides of the path of travel of the glass sheet 1. Bars 19 and 20 are of massive rigid structure, and preferably have a width approaching that of tools 2 and 4. Abutments 26, to which the transverse bars are attached at their four corners, retain bars 19 and 20 from horizontal travel. Mechanism is provided, however, whereby bar 20 may be adjusted to bring the upper surface of surfacing structure 5 of tool 4 into contact with the lower surface of glass sheet 1. The tool 4 and its surfacing structure 5 thus serve to support the glass sheet in opposition to the thrust of tool 2, as well as themselves functioning to surface the lower face of the glass. An additional means is provided whereby the upper transverse bar 19, and the upper tool 2 pressed thereby, may be thrust downwardly with the requisite pressure toward the upper surface of the glass.

Interposed between the transverse bars and the respective surfacing tools are two sets of pressure blocks, one adjacent each end of each tool. A first block 21 has a part-cylindrical outer surface 23 which fits within a correspondingly shaped seat in the confronting surface of the transverse bar. A second block 22 is fixed to the main platen structure of the tool. The surfaces between the blocks 21 and 22 and between projection 23 and its seat on the transverse bar are suitably lubricated so that the block 22 slides on block 21, and block 21 rocks in the seat on the transverse bar as required by the described circular translatory motion of the surfacing tool.

The abutments 26 are of massive rigid construction, and may be made, for example, of reinforced concrete. Each of the abutments has a strong horizontal projecting bracket 25 mounted thereon, each bracket carrying a shaft 24 projecting vertically therethrough. Each shaft is mounted, by means of bearings (not shown) between the bracket and the shaft so that the shaft may rotate with respect to the bracket but is held from vertical movement with respect thereto. Each shaft 24 has a worm gear 28 keyed thereto below bracket 25 so that the shaft 24 may be turned as by means of a worm 27 meshing with gear 28. The lower end of each shaft 24 is threaded as shown and threadedly engages a plate-like crosshead 29. Each of the ends of transverse bar 20 is centrally slotted in a vertical direction so as to form legs which lie on either side of the threaded lower portion of shaft 24 and in contact with the upper surface of crosshead 29. Thus rotation of shafts 24 in the proper direction will raise transverse bar 20 and tool 4 to the proper height to provide supporting and surfacing engagement between part 5 of the lower tool and the lower surface of the glass. Such adjustment of the lower transverse bar is preferably effected by rotating worms 27 in synchronism, as by the provision of separate synchronous motors. Preferably provision is made for the additional manual rotation of each of worms 27 so that the lower tool may be accurately adjusted to its working position.

The ends of the upper transverse bar 19 are thrust downwardly by means of hydraulic jacks or mounted upon the upper ends of shafts 24 and acting between the ends of bar 19 and crosshead 29. As shown, the upper end of each shaft 24 is of a smooth circular cylindrical shape. The upper end of each shaft 24 slidably receives a hydraulic jack which has a first, inner portion 31 having a bore therein receiving the shaft, a lower flange which overlies the legs of the slotted extremity of transverse bar 19, and an annular chamber-forming recess therein. Slidably mounted upon the upper end of member 31 is a cylindrical casing 33 having a central inwardly projecting annular flange 34 sealingly cooperating with the radially inner surface of the chamber-forming recess in member 31.

Members 31 and 33 thus provide an expansible annular space or chamber 32 between them. When such space is fed with fluid under pressure, as through an inlet 50', and member 33 is held from upward movement, member 31 is thrust downwardly into engagement with the end of pressure bar 19, thereby applying surfacing pressure to the upper tool 2. During use of the apparatus, each of cylinder chambers or spaces 32 is subjected to the same fluid pressure, as by connecting it to the same source of fluid pressure. To hold the cylinder 33 from upward movement, it is preferably connected to crosshead 29 in the manner shown. Such connection is provided by diametrically opposed tie rods each in the shape of an inverted U having legs 36 pivotally attached by pivot pins 30' to opposed laterally projecting ears 30 on crosshead 29. The upper closed end of each tie rod receives a laterally extending trunnion-like member 35 which is affixed to cylinder casing 33.

Let us assume that the apparatus is being placed in operation after replacement of both surfacing tools. The transverse bars 19 and 20 will have been removed to allow such replacement. With the tools in place, the lower transverse bar 20 will then be installed and will be adjusted vertically by rotation of shafts 24 in the manner above described. Following this, the upper transverse bar 19 will be installed and a hydraulic jack or motor will then be telescoped over the upper end of each shaft 24. The tie rods 36 will then be pivoted inwardly to connect their upper ends to members 35. The inlets 50' for the hydraulic jacks will then be subjected to hydraulic pressure of the desired amount to exert the desired surfacing pressure upon the upper tool 2. Such pressure is continually exerted upon the tool throughout the permissible range of travel of the jacks, so that no additional adjustment of tool 2 is required for extended periods as the surfacing structure 3 wears down. Occasionally, as surfacing structure 5 of the lower tool wears, jacks 24 will be rotated to adjust the lower transverse bar 20 upwardly as required to maintain the glass sheet 1 in the desired plane of travel.

A second illustrative form of apparatus in accordance with the invention is shown in Figures 9 to 13, inclusive. Figures 11, 12, and 13 show a modification of the apparatus of Figures 9 and 10. Such second form of apparatus operates in the manner generally shown in Figure 2.

In the apparatus of Figures 9 and 10, the surfacing tool 37, which is rectangular in plan, is provided with a surfacing structure in the form of a layer of felt 38. The surfacing tool is driven by two vertical parallel shafts 39 and 40 which turn at the same speed and in the same direction. Each one of shafts 39 and 40 carries a crank on its lower end, the crank on shaft 39 being designated 41 and that on shaft 40 being designated 42. Crank 41 has the crank pin thereof rigidly attached to surfacing tool 37 by means of a stub shaft 43 fixedly secured to the tool. The stub shaft is provided with a threaded lower end 44 which is received in the internally threaded boss 45 on the tool laterally centrally and adjacent a first end thereof. The stub shaft 43 rotates freely in the hollow crank pin of crank shaft 41, so that, when shaft 39 turns, the boss 45 and the portion of the tool in alignment therewith describe a circle.

The crank 42 similarly carries a stub shaft 46 within the hollow crank pin of the crank, the pin being freely rotatable with respect to the crank pin. The lower end of stub shaft 46 is threadedly received in a slide block 47 which is slidably mounted in a guideway 48 which extends longitudinally of the tool adjacent a second end thereof and is centrally disposed laterally of the tool. The guideway is preferably provided with two inwardly extending upper flanges 49 which overlie block 47 and prevent its vertical withdrawal from the guideway. It will be seen that such structure allows the axis of stub shaft 46 to move longitudinally of the tool with respect to the axis of shaft 43 without imposing an additional strain upon either the tool or the driving mechanism therefor. The shafts 39 and 40 are driven by helicoidal pinions 50 and 51, respectively, such pinions being keyed to sleeves 52 and 53, respectively, which are rotatably mounted in the framework of the apparatus. Sleeves 52 and 53 are splined to shafts 39 and 40 at 54 and 55, respectively, so that shafts 39 and 40 may be vertically adjusted while maintaining a driving relationship with pinions 50 and 51. Shafts 39 and 40 may be vertically adjusted as by arms 56 and 57, respectively, having forked inner ends engaging thrust collars on the upper ends of the shafts, as shown. Thus, the surfacing tool 37 may be readily adjusted vertically, as required, during operation of the apparatus to maintain both ends of the tool in engagement with the desired pressure against the surface of the glass. Pinions 50 and 51 may be driven by a motor 60 through the medium of a worm shaft 61 in mesh with such pinions.

In the apparatus of Figures 9 and 10 the distribution between the cranks of the forces they impose upon the surfacing tool to overcome the resistance imposed upon the tool by the glass, varies constantly upon each turn of the cranks. These forces are equally or substantially equally distributed when the cranks are directed substantially according to the longitudinal axis of the surfacing tool. Under such condition the slide block 47 is thrust against one of the sides of the guideway.

On the other hand, when the cranks are disposed perpendicularly or substantially perpendicularly to the longitudinal axis of the tool the slide block 47 runs freely in a longitudinal direction, that is, it does not transmit any force to the tool, and all the driving force exerted on the tool is contributed by crank 41. It will thus be seen that the distribution of forces between the two shafts 39 and 40 varies periodically in a continuous manner, and that the shaft 39 contributes most of the driving effort. This causes shaft 39 and its driving mechanism to wear more quickly than shaft 40 and its driving mechanism.

In Figures 11, 12, and 13, there is shown a modification of the apparatus of Figures 9 and 10 whereby the driving effort for the tool 37 is more equally divided between the two driving shafts. Figures 11, 12, and 13, show a structure which may be substituted for the slide block 47 and the guideway 48 in a mechanism such as that shown in Figures 9 and 10.

In Figures 11, 12, and 13, the surfacing tool is designated 71. A slidable block 72 is mounted on tool 71 in a guideway disposed longitudinally of the tool. Such guideway has opposite side members 73 provided with inwardly extending upper flanges 74 and with end members 76. A stub shaft 75, corresponding to shaft 46 in Figures 9 and 10, has the lower end thereof secured to slide block 72. Each end of block 72 has an oppositely extending spring seat-providing stud 81 thereon. Positioned in alignment with each of studs 81 there is a second spring seat 79, 80, which engages the other end of a coil compression spring 77 between it and block 72. Spring seat 79, 80, is positioned on the inner end of a threaded stud 78 having threaded engagement with a bore through end member 76 of the guideway. The initial compression of each of springs 77 may be suitably adjusted by turning the outer wrench-engaged end 82 of stud 78. Such stud may be retained in its desired adjusted position by a lock nut 83 on the stud.

The mechanism of Figures 11, 12, and 13 eliminates the possibility of a build-up of any substantial destructive forces in the apparatus upon the change of dimension of the surfacing tool or the driving mechanism therefor. At the same time, because springs 77 elastically oppose movement of block 72 from the central position thereof, shown in Figures 11 and 13, the crank which mounts stub shaft 75 more nearly contributes the same driving effort to the tool at all times during its turning cycle as the crank, such as crank 41 of Figures 9 and 10, which is rigidly attached to the tool.

The stiffness of the springs 77, if sufficient, enable the driving in rotation of the surfacing tool 71 by the sliding block 72 even when the power transmitted by the crank is substantially parallel to the longitudinal axis of the surfacing tool. The flexibility of the springs 77 permits nevertheless the longitudinal displacements of the sliding block 72.

Both disclosed illustrative embodiments of the apparatus are of advantage by reason of their simple rugged construction which allows the accurate surfacing of glass sheets and plates quickly and with a minimum of maintenance of the machine. In the apparatus of Figures 3–8, inclusive, the glass sheet is surfaced simultaneously on both sides thereof; such apparatus is advantageous for that case. Such apparatus, in the specific embodiment shown, is also of advantage in minimizing the stresses imposed on the glass as a result of the simultaneous surfacing operations on opposed surfaces thereof. The 180° displacement of the cams driving the upper and lower surfacing tools in synchronism causes such tools to have instantaneous movements which are equal and opposite in direction. As a result, the forces acting upon the upper and lower surfaces of the glass tend to cancel each other, and the apparatus has no pronounced tendency at any time to move the glass sheet sidewardly from its path of travel.

Although only a limited number of embodiments of the invention have been illustrated in the accompanying drawings and described in the foregoing specification, it is to be expressly understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. An apparatus for surfacing sheets of glass, comprising a surfacing tool, and means to give the tool a translatory motion along closed directing curves, said last named means comprising two synchronized driving means connected to move in phase and attached to the tool at spaced points on the tool, means including a first connection fixedly connecting a first one of said driving means to the tool, and means connecting the second one of said driving means to the tool, said last-named means including a second, mechanical connection which provides a limited freedom of movement between the tool and said second driving means.

2. An apparatus as defined in claim 1, wherein said mechanical connection drives the surfacing tool positively in a transverse direction but allows free movement of the tool with respect thereto in a direction longitudinally of the tool.

3. An apparatus as defined in claim 1, wherein the connections between the tool and the first and second driving means are disposed within the projected opposite side edges of the tool, and the second connection is attached to the tool so as to move it positively only in a transverse direction and to move freely with respect thereto in a direction longitudinally of the tool.

4. An apparatus as defined in claim 1, comprising means for pressing the surfacing tool against the glass, such pressing means comprising a transverse bar, such bar being fixed during operation of the apparatus and exerting surfacing force on the tool.

5. An apparatus as defined in claim 4, comprising supports, each support comprising a screw, and means connecting the transverse bar to the screws so that the screws adjust the position of the transverse bar.

6. An apparatus as defined in claim 4, comprising supports, each support comprising a hydraulic jack, and means connecting the hydraulic jacks to the transverse bar so that the jacks exert surfacing pressure on the surfacing tool.

7. An apparatus as defined in claim 1, wherein said first and second driving connections include means whereby they can be readily disconnected.

8. An apparatus as defined in claim 1, wherein said mechanical connection comprises a rod pivotally connecting the said second driving means and the tool.

9. An apparatus as defined in claim 8, wherein the first driving means is disposed in alignment with the tool adjacent one end of the tool, and the second driving means is disposed at a side of the tool adjacent the other end of the tool.

10. An apparatus as defined in claim 8, wherein the first driving means is centrally disposed beyond one end of the tool and comprises a driven eccentric and an eccentric follower fixedly connected to the tool, and the second driving means is disposed at and connected to a side of the tool adjacent the other end of the tool and comprises a driven eccentric and an eccentric follower pivotally connected to the tool.

11. An apparatus for the surfacing of a glass sheet, comprising a surfacing tool, means to give to the tool a translatory motion along closed directing curves, said last-named means comprising two synchronized driving means connected to move in phase and attached to the tool at spaced points on the tool, a first one of said driving means having a first fixed driving connection to the tool, the second one of said driving means being connected to the tool by means of a second mechanical link-connection which provides a limited freedom of movement between the tool and said second driving means.

12. An apparatus for the simultaneous surfacing of glass sheets on both sides thereof, comprising opposed elongated parallel surfacing tools receiving a glass sheet between them, and means to give each of the tools a translatory motion along closed directing curves, said last named means comprising a first driven shaft, first eccentric fixed driving connections between the first shaft and each tool adjacent a first end thereof, a second driven shaft, and second eccentric driving connections between the second shaft and each tool adjacent the second end thereof, said second eccentric connections each including means connecting the said second driving means and the tool so as to provide a limited freedom of movement between the tool and said second shaft.

13. An apparatus as defined in claim 12, wherein each of the second driving connections includes an eccentric on the second shaft, an eccentric follower, and a rod pivotally connected to and extending between the eccentric and the tool adjacent the second end thereof.

14. An apparatus as defined in claim 13, wherein the first driven shaft is disposed in alignment with the tools beyond the first end thereof, the first eccentric connections are attached to the first end of each of the tools, the second driven shaft is disposed at one side of the tools adjacent the second end thereof, and the second eccentric driving connections are attached to the sides of the tools confronting the second shaft.

15. An apparatus as defined in claim 12, comprising means for pressing the surfacing tools against the glass, such pressing means comprising opposed transverse bars, such bars being fixed during operation of the apparatus and each exerting force on the corresponding tool.

16. An apparatus as defined in claim 12, wherein the glass sheet is positioned horizontally, the adjustment of the height of the lower surfacing tools relative to the sheet of glass is provided by supports, each support comprising a vertically disposed screw, the upper end of the screw carrying a hydraulic jack which exerts surfacing pressure upon the upper surfacing tool.

17. An apparatus as defined in claim 1, wherein said second mechanical connection comprises a guideway member and a slide member reciprocably mounted on the guideway member, one of said members being fixedly attached to the tool and the other of said members being connected to the said other driving means.

18. An apparatus as defined in claim 17, wherein circular translatory movement is applied to the surfacing tool by two cranks, one of such cranks being directly attached to the surfacing tool, the other of such cranks being attached at a second point to the surfacing tool through the medium of said guideway and slide.

19. An apparatus as defined in claim 17, comprising elastic means for opposing longitudinal displacements of the slide in the guideway.

20. An apparatus as defined in claim 17, wherein the cranks have main shafts, crank arms, and crank bearings on the outer ends of the crank arms the main shafts rotate about axes perpendicular to the surfacing plane of the tool, and the crank bearings turn freely with respect to the tool.

21. An apparatus as defined in claim 20, wherein the crank bearing of one of said cranks is journalled on the surfacing tool on an axis fixed with respect thereto.

22. An apparatus as defined in claim 20, wherein the crank bearing of the other crank is rotatably mounted in a block which is mounted to reciprocate with respect to the tool parallel to the longitudinal axis of the same.

23. An apparatus as defined in claim 19, wherein the elastic means comprises a coil compression spring interposed between each end of the slide and the confronting end on the guideway.

24. An apparatus as defined in claim 23, wherein the tension of each of said springs is adjustable by means of a threaded stud adjustably mounted at the end of the guideway and carrying a spring seat on its inner end.

25. An apparatus for the surfacing of a glass sheet, comprising an elongated surfacing tool, means to give to the tool a translatory motion along closed directing curves, said last named means comprising a first driven shaft, a first, fixed crank-connection between the first shaft and one point of the tool, a second driven shaft, a second crank and a connecting bar pivotally connecting the throw of the second crank to a second point of the tool so as to provide a limited freedom of movement between the tool and the said second shaft.

26. An apparatus for the surfacing of a glass sheet, comprising an elongated surfacing tool, means to give to the tool a translatory motion along closed directing curves, said last named means comprising a first driven shaft, a first eccentric driving connection between the first shaft and one point of the tool, a second driven shaft, a second eccentric driving means on the second shaft, and a connecting bar connected to the second eccentric driving means and a second point of the tool so as to provide a limited freedom of movement between the tool and the said second shaft.

27. An apparatus according to claim 26 in which the first shaft provided with an eccentric directly connected to the tool is placed at one end of the tool, and the second shaft provided with an eccentric connected to the tool by a connecting bar is placed on one side of the tool.

28. In an apparatus for polishing simultaneously both faces of a glass sheet between polishing tools moved according to a translatory motion along closed directing curves, means to press the tools against the glass sheet comprising an upper elongated member and a lower elongated member, said elongated members being fixed during the surfacing work, the elongated members thrusting the respective tool against the glass through the intermediary of engaging plates, said plates being connected, respectively, to the pressing members and to the tools.

29. An apparatus for surfacing sheets of glass, comprising a surfacing tool, and means to give the tool a translatory motion along closed directing curves comprising two synchronized driving means connected to move in phase and attached to the tool at spaced points of the tool, the first driving means being directly attached to the surfacing tool, and the other of said driving means being attached to a second point of the surfacing tool through the medium of a mechanical connection which provides a limited freedom of movement between the tool and said second driving means.

30. An apparatus as defined in claim 29 wherein the glass sheet is actuated with a rectilinear translatory motion with regard to at least one surfacing tool having a rectangular shape extending substantially over the entire width of the glass sheet, and wherein said mechanical connection drives the surfacing tool positively in a transverse direction but allows free movement of the tool with respect thereto in a direction longitudinally of the tool.

31. An apparatus as defined in claim 30, wherein the first driving means is disposed in alignment with the tool adjacent one end of the tool, and the second driving means is disposed at a side of the tool adjacent the other end of the tool.

32. An apparatus as defined in claim 30 wherein the mechanical connection is constituted by a slideway secured to the tool, in which said other driving means slides.

33. An apparatus as defined in claim 29 wherein the mechanical connection is constituted by a connecting rod.

34. An apparatus as defined in claim 29 for simultaneously surfacing both faces of a glass sheet, wherein the upper and lower surfacing tools of one pair are directly driven at one of their ends by a common vertical shaft provided with eccentrics, and are driven at the other end by a second vertical shaft provided with eccentrics, each eccentric of said second shaft being connected to the corresponding surfacing tool by a connecting rod.

35. An apparatus as defined in claim 34 wherein the shaft provided with eccentrics directly driving the surfacing tools is mounted endwise of the latter and the shaft provided with eccentrics driving the surfacing tools through connecting rods is situated to one side of the surfacing tools.

36. An apparatus as defined in claim 35 wherein the surfacing tools are connected to the driving members by means of readily removable pins.

37. An apparatus as defined in claim 34 wherein the surfacing tools are adjusted relative to the glass sheet by means of vertically extending columns, rotatably mounted in brackets, the columns having a lower portion screw-threaded to receive a corresponding threaded plate on which the lower transverse bar rests and an upper portion adapted to receive a hydraulic jack which rests on the upper transverse bar.

38. An apparatus as defined in claim 32 wherein the movements of the driving member in the slideway in a direction parallel to the longer axis of the surfacing tool are opposed by spring means.

39. An apparatus as defined in claim 29, wherein the means for driving the tool at the end thereof comprises a vertical shaft having an eccentric thereon, such eccentric communicating its movement to the tool through a connecting device attached to the tool.

40. An apparatus as defined in claim 29, wherein the means for driving the tool at the side thereof comprises a vertical shaft having an eccentric thereon, an eccentric follower, and means pivotally connecting the eccentric follower to the tool.

References Cited in the file of this patent

UNITED STATES PATENTS

| | | |
|---|---|---|
| 1,909,902 | Amsler | May 16, 1933 |
| 1,962,767 | Crowley | June 12, 1934 |